United States Patent [19]
Aso et al.

[11] Patent Number: 5,553,068
[45] Date of Patent: Sep. 3, 1996

[54] ATM CELL BROADCASTING SYSTEM

[75] Inventors: Yasuhiro Aso, Tokyo; Atsuhisa Takahashi, Kawasaki; Satoshi Kakuma, Kawasaki; Yoshihiro Uchida, Kawasaki, all of Japan

[73] Assignee: Fujitsu Limited, Kanagawa, Japan

[21] Appl. No.: 479,865

[22] Filed: Jun. 7, 1995

Related U.S. Application Data

[63] Continuation of Ser. No. 375,221, Jan. 19, 1995, abandoned, which is a continuation of Ser. No. 671,526, Mar. 19, 1991, abandoned.

[30] Foreign Application Priority Data

Mar. 19, 1990 [JP] Japan ................................. 2-066834

[51] Int. Cl.$^6$ .................................................. H04Q 11/04
[52] U.S. Cl. ................................ 370/60; 370/54; 370/62; 370/94.1; 370/110.1
[58] Field of Search ............................. 370/54, 58.1, 60, 370/77, 112, 94.1, 62, 84, 110.1

[56] References Cited

U.S. PATENT DOCUMENTS

| | | | |
|---|---|---|---|
| 3,824,597 | 7/1974 | Berg | 343/204 |
| 4,947,388 | 8/1990 | Kuwahara et al. | 370/60 |
| 4,993,018 | 2/1991 | Hajikano et al. | 370/54 |
| 5,020,054 | 5/1991 | May, Jr. | 370/94.1 |
| 5,038,343 | 8/1991 | Lebizay et al. | 370/54 |
| 5,050,164 | 9/1991 | Chao et al. | 370/85.12 |
| 5,062,106 | 10/1991 | Yamazaki et al. | 370/85.6 |
| 5,084,867 | 1/1992 | Tachibana et al. | 370/60 |
| 5,113,392 | 5/1992 | Takiyasu et al. | 370/94.1 |
| 5,157,654 | 10/1992 | Cisneros | 370/60 |
| 5,181,200 | 1/1993 | Harrison et al. | 370/85.1 |
| 5,191,577 | 3/1993 | Uchida et al. | 370/94.1 |
| 5,214,651 | 5/1993 | Baydar et al. | 370/94.1 |
| 5,235,595 | 8/1993 | O'Dowd | 370/60 |

FOREIGN PATENT DOCUMENTS

| | | |
|---|---|---|
| 0339735 | 11/1989 | European Pat. Off. . |
| 8805982 | 8/1988 | WIPO . |
| 8909521 | 10/1989 | WIPO . |

OTHER PUBLICATIONS

IEEE Global Telecommunications Conference & Exhibition, Hollywood, Florida, 28th Nov.–1st Dec. 1988, vol. 3, pp. 1272–1276, IEEE, New York, US; S. Ohta et al.: "A dynamically controllable ATM transport network based on the virtual path concept".

IEEE Int. Conf. on Communications, '89, vol. 1, Jun. 1989, pp. 118–122, IEEE, Boston, US; H. Kuwahara et al.: "A shared buffer memory switch for an ATM exchange".

Ahmadi et al., "A Survey of Modern High Performance Switching Techniques", Sep. 1989 IEEE Journal On Selected Areas in Communications.

Kato et al., "Experimental Broadband ATM Switching System", Fujitsu Laboratories Ltd., Nov. 1988 (pp. 1288–1292).

Kato et al., "A VLSIC for the ATM Switching System", International Switching Symposium, vol. 3, May 1990 (pp. 27–32 Section 3.4–3.4(2), Section 5, 1st paragraph).

Ni et al., "A VLSI Router Design for Hypercube Multiprocessors", Integration, the VLSI Journal, vol. 7, Aug. 1989 (pp. 103–125/Section 3.3).

Primary Examiner—Douglas W. Olms
Assistant Examiner—Shick Hom

[57] ABSTRACT

An ATM (asynchronous transfer mode) cell broadcasting system for use in ATM switches comprises switch matrices for exchanging ATM cells inputted from a plurality of input highways and outputting them to a plurality of output highways. The ATM cell broadcasting system further includes tag information adders, provided at respective input terminals of the switch matrices, for adding tag information according to respective identifiers assigned to the ATM cells. Alternatively, ATM-cell-switching identifier determinant memories may be provided for respective switch elements in the switch matrices, for storing determinant data enabling the switch elements to determine, from the identifiers of the ATM cells, which ones of the ATM cells are to switch and output to their respective output highways.

13 Claims, 8 Drawing Sheets

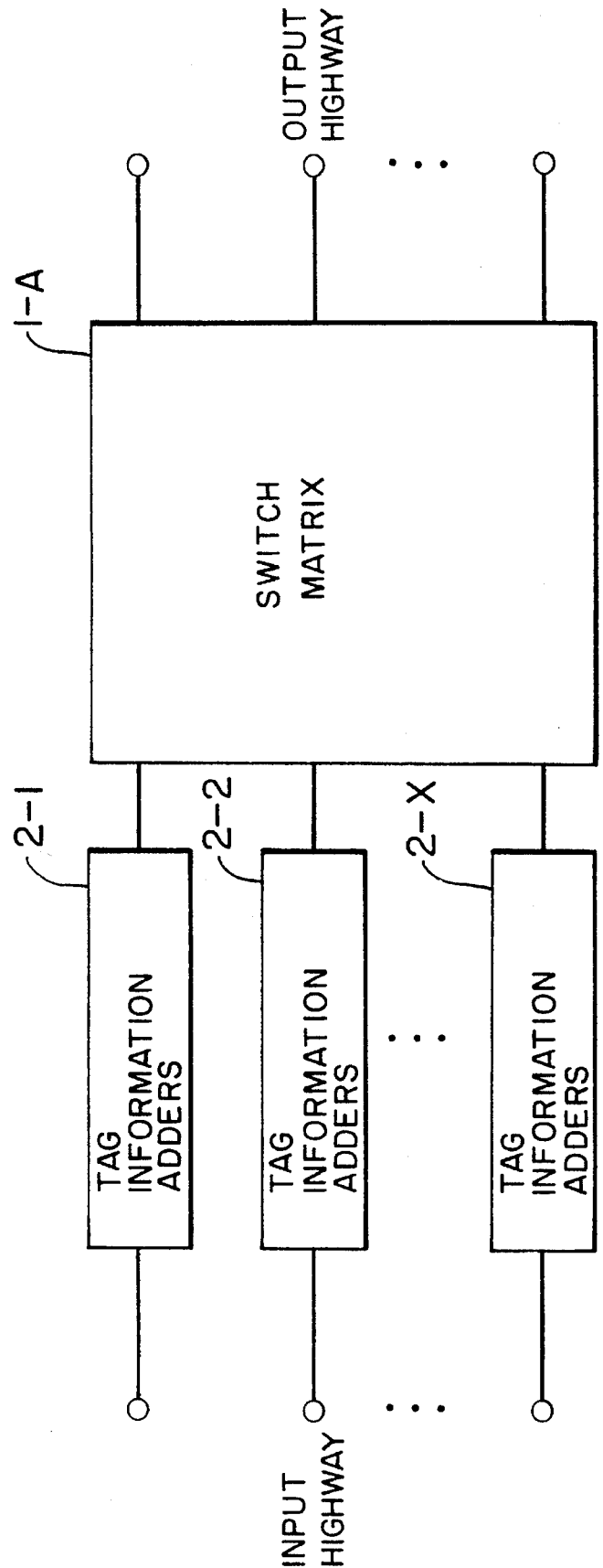
FIG. IA

| VPI | VCI | TAG INFORMATION |
|---|---|---|
| 0001 | 0001 | 0011 |
| 0001 | 0010 | 0101 |
| ⋮ | ⋮ | ⋮ |

FIG. 4

| ADDRESS | DATA |
|---|---|
| 000····00 | 0 |
| 000····01 | 1 |
| ⋮ | |
| 111····10 | |
| 111····11 | 0 |

ATM CELL BROADCASTING SYSTEM

This application is a continuation of application Ser. No. 08/375,221 filed Jan. 19, 1995 and now abandoned and which is in turn a continuation of application Ser. No. 671,526 filed Mar. 19, 1991 and now abandoned.

BACKGROUND OF THE INVENTION

1. Field of the Invention

This invention pertains to a digital switching system, and more particularly to an ATM (Asynchronous Transfer Mode) cell broadcasting system utilized in ATM switches, e.g. for ISDN (Integrated Service Digital Network), which exchange ATM cells representing information having different traffic characteristics such as voices, data and moving images.

2. Description of the Related Art

With the recent widespread use of data communication, publicly switched networks now carry important data, as well as traditional voices, and are required to offer high-quality data transmission and exchange.

As a communication network for serving not only low speed data such as voice data, but also high speed data such as moving images, a broadband ISDN (B-ISDN) has begun to be put into practical use and various interfaces are being standardized. Unlike traditional switching methods, a B-ISDN utilizing an asynchronous transfer mode (ATM) can commonly carry various sorts of information at different speeds, e.g. voice data, moving image data and even continuous information mixed with burst information.

An ATM communication network transmits and exchanges information of different bands divided and housed in fixed-length data units called cells, instead of information divided and housed in variable-length packets used in traditional packet communication. Cells containing channel data are indiscriminately multiplexed, transmitted over optical fibers at high speed, and fast-exchanged by hardware switches. Thus, an ATM communication network can offer flexible services requiring different transmission speeds and makes efficient use of transmission paths.

User information is divided into several pieces according to its length and cells are configured by adding headers, e.g. of a few bytes, to the respective data, e.g. of 32 to 120 bytes, comprising the divided pieces of information. A header contains a virtual channel identifier (VCI) for identifying the originating user of the corresponding data. Thus, user information stored in cells is multiplexed over ATM highways before it is transmitted and exchanged. Switch elements in a switch matrix route cells to their respectively connected output highways, when they are turned on.

That is, a conventional switch matrix enables one-to-one communication by outputting an ATM cell inputted from an input highway to only one of a plurality of output highways. Therefore, there is a problem that it lacks the capacity for one-to-many communication, i.e. from one originator to a plurality of destinations, by outputting an ATM cell inputted from an input highway to a plurality of output highways.

SUMMARY OF THE INVENTION

An object of the present invention is to broadcast data stored in cells to a plurality of destinations by outputting the cells to a plurality of output highways in an ATM switch.

An ATM (Asynchronous Transfer Mode) cell broadcasting system is utilized in ATM switches, e.g. for ISDN (Integrated Service Digital Network), which exchange ATM cells representing information having different traffic characteristics such as voices, data and moving images.

It configures a switch matrix, for exchanging ATM cells inputted from an input highway by outputting them to a plurality of output highways, to be provided with tag information adders, for adding to the ATM cells tag information corresponding to the VCI of the ATM cells, at its respective input terminals connected to input highways.

BRIEF DESCRIPTION OF THE DRAWINGS

FIGS. 1A and 1B are block diagrams respectively illustrating a first and a second principle of this invention;

FIG. 4 shows exemplary contents stored in a tag information memory;

FIG. 7 shows exemplary contents stored in an ATM-cell-switching VCI/VPi determinant memory for memorizing the VCI/VPi of the ATM cells to be switched.

DESCRIPTION OF THE PREFERRED EMBODIMENT

Figure 1B:
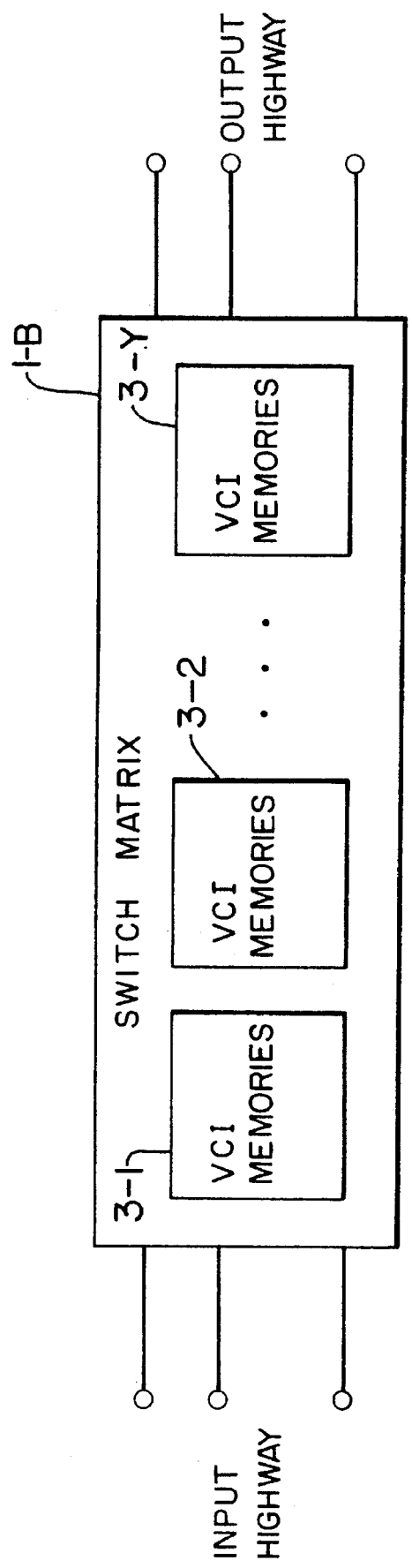

The first and second principles of this invention are explained by referring to FIGS. 1A and 1B, where switch matrices 1A and 1B output, to a plurality of output highways, ATM cells inputted from input highways by exchanging them.

FIGS. 1A and 1B are block diagrams respectively illustrating a first and a second principle of this invention.

In FIG. 1A, tag information adders 2-1 through 2-X are converters provided at respective N input terminals connected to input highways in a preceding stage of switch elements of switch matrix 1-A. They add to the ATM cells tag information for simultaneously outputting the ATM cells to a plurality of output highways corresponding to the VCI/VPi (indicating the originator) of the ATM cells. When switch matrix 1-A comprises e.g. 4*4 switch elements [for four (4) input highways and four (4) output highways], four (4) switch elements receive the same ATM cells from an input highway. If the tag information adder 3-i (where i is an integer from 1 to 4) corresponding to the input highway adds tag information, e.g. 0101, to the ATM cells, the second and fourth switch elements, e.g. from the input highway, are turned on and output the ATM cells to the output highways connected to these switch elements.

In FIG. 1B, ATM-cell-switching VCI determinant memories 3-1 through 3-Y for memorizing the VCI of ATM cells to be switched are provided at the M switch elements in switch matrix 1-B. Upon receiving ATM cells, the M switch elements judge whether or not they should be turned on and output the ATM cells from the corresponding input highways to the corresponding output highways, by referring to the corresponding ATM-cell-switching VCI/VPi determinant memories 3-1 through 3-Y. By variably setting routing information utilizing VCI/VPis in ATM-cell-switching VCI/VPi determinant memories 3-1 through 3-Y e.g. by software, the switch elements, whose ATM-cell-switching VCI/VPi determinant memories 3-1 through 3-Y have the same VCI/VPis as the ATM cells inputted from an input highway, output the ATM cells simultaneously to a plurality of output highways.

Thus, this invention enables ATM cells copied in a switch matrix to be transmitted simultaneously to a plurality of destinations.

Figure 2:
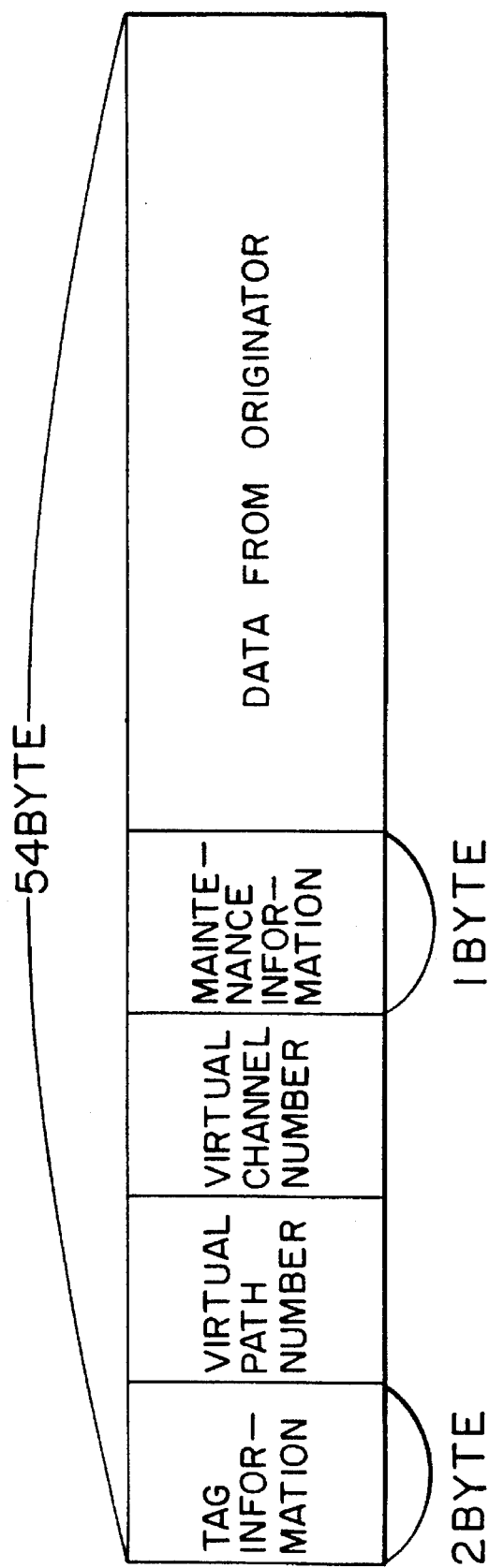
FIG. 2 shows an exemplary configuration of an ATM cell.

FIG. 2 shows an exemplary configuration of an ATM cell.

In FIG. 2, an ATM cell has a total length of fifty-four (54) bytes. Its two (2) head end bytes store tag information for enabling the ATM cell inputted from an input highway to be outputted simultaneously to a plurality of output highways, according to the first principle of this invention. Next, after appropriate bytes for a virtual path number and the virtual channel number corresponding to a VCI, a maintenance datum of one (1) byte and message data from an originator of the remaining bytes are stored. According to the second principle of this invention, no tag information is required. Thus, the two (2) head end bytes remain empty.

Figure 3:
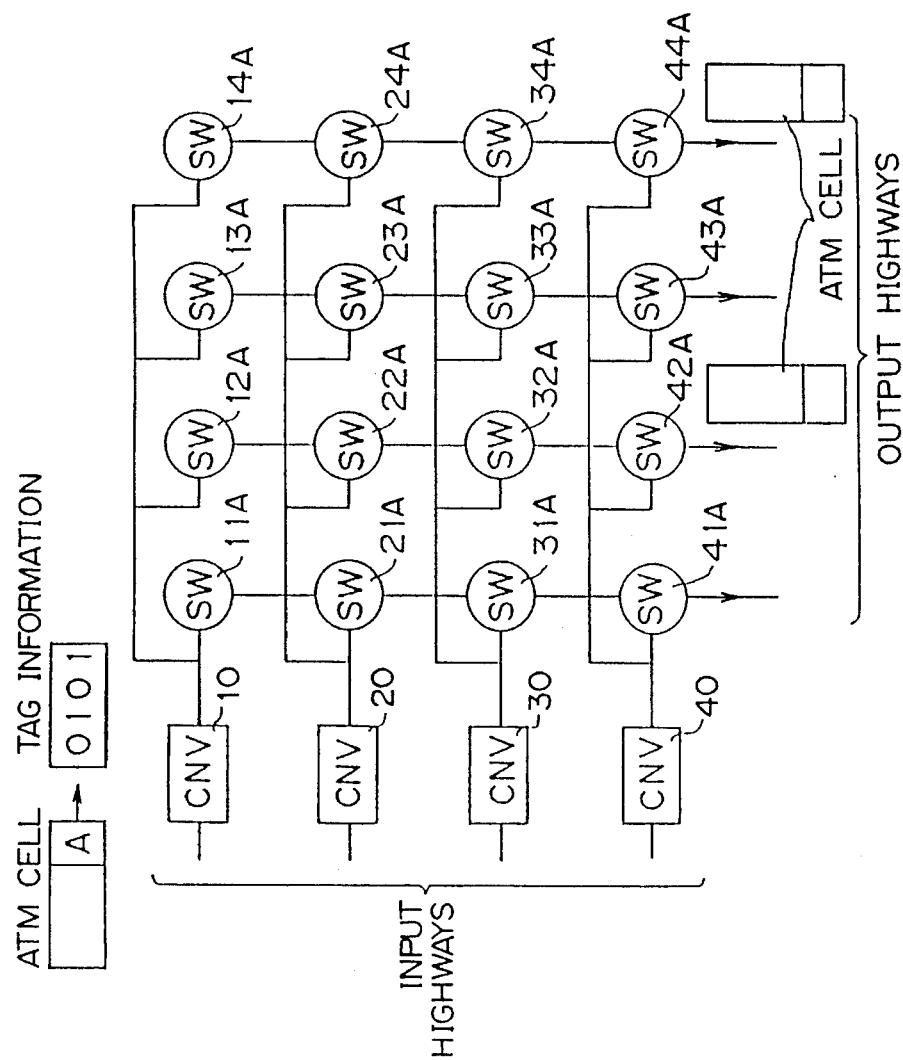
FIG. 3 is a block diagram showing the broadcasting system according to the first principle of this invention.

FIG. 3 is a block diagram showing the broadcasting system according to the first principle of this invention.

The switch matrix shown in FIG. 3 comprises 4*4 switch elements for simplicity. In reality, a plurality of such switch matrices configure a large scale ATM switch. CNVs 10 through 40 are converters for converting to tag information the VCIs of ATM cells transmitted over corresponding input highways and enabling the ATM cells to be outputted to a plurality of output highways. On receipt of ATM cells, CNVs 10 through 40 read the tag information from a memory, not shown in the drawing, by using the VCI/VPis of the ATM cells. The bit length of tag information is equal to the number of switch elements receiving the ATM cells from the same input highway. In this case, since four (4) switch elements are connected to the each input highway through a converter, the tag information has four (4) bits. As shown in FIG. 2, the tag information is attached to the ATM cells, which are inputted to switch elements (SWs) 11-A through 44-A connected to CNVs 10 through 40.

Assume here that ATM cells are inputted via CNV 10 to SWs 11-A through 14-A, CNV 10 converts the VCI of the ATM cells to 4-bit tag information 0101, and respective bits of tag information from the highest digit represent the flags of SWs 11-A through 14-A to be turned on. Since SWs 12-A and 14-A are turned on, they output the ATM cells to the output highways connected to them. Since SW 11-A and 13-A are not turned on, they do not output the ATM cells to the the output highways connected to them. Thus, the ATM cells of the same VCI inputted to CNV 10 are switched to two (2) of the four (4) output highways, and the ATM cells are broadcast to the intended destinations.

FIG. 4 shows exemplary contents stored in a tag information memory.

CNVs 10 through 40 shown in FIG. 3 refer to contents of a tag information memory. This invention purports to determine whence inputted ATM cells are outputted from the virtual path numbers and/or virtual channel numbers of the ATM cells. The tag information shown in FIG. 4 is set according to the virtual path numbers and the virtual channel numbers. Although the example shown in FIG. 4 illustrates a case in which both the virtual path numbers and the virtual channel numbers are of four (4) bits, ordinarily they are longer, e.g. of eight (8) bits or sixteen (16) bits.

Figure 5:
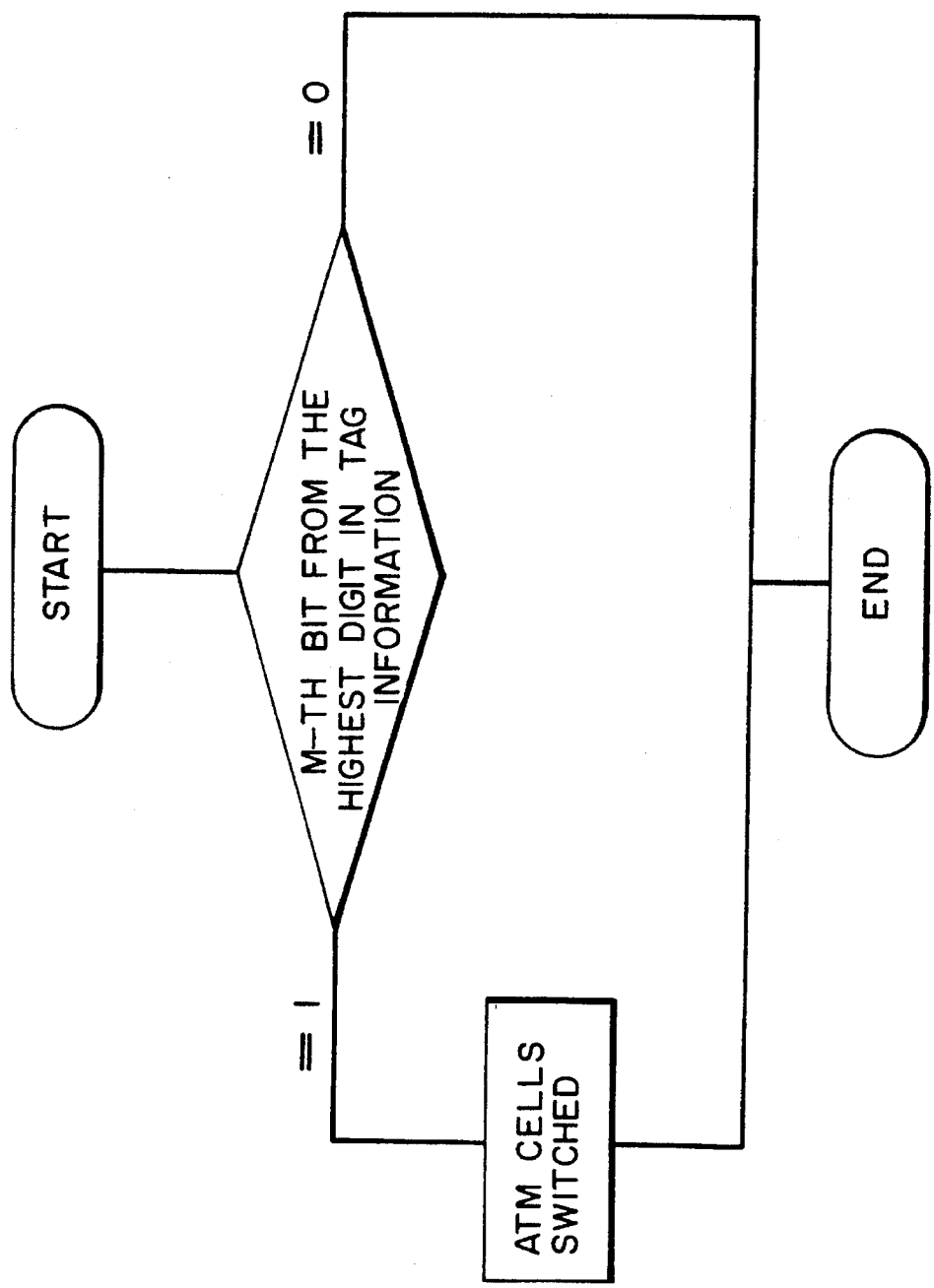
FIG. 5 is a flowchart of a switching judgment embodying the first principle of this invention.

FIG. 5 is a flowchart of a switching judgment embodying the first principle of this invention. More specifically, FIG. 5 is a flowchart of the switching judgment by SW NM-A, where N and M are any integers from 1 to 4. Since SW NM-A is located at the N-th position from the top and M-th position from the left in a switch matrix, it is connected with the N-th converter CNV N0 and its flag is represented by the M-th bit from the highest digit of the tag information.

In FIG. 5, after the processes begin, it is judged first whether the M-th bit from the highest digit in the tag information is 0 or 1, and the processes end without or after switching inputted ATM cells when it is 0 or 1.

Figure 6:
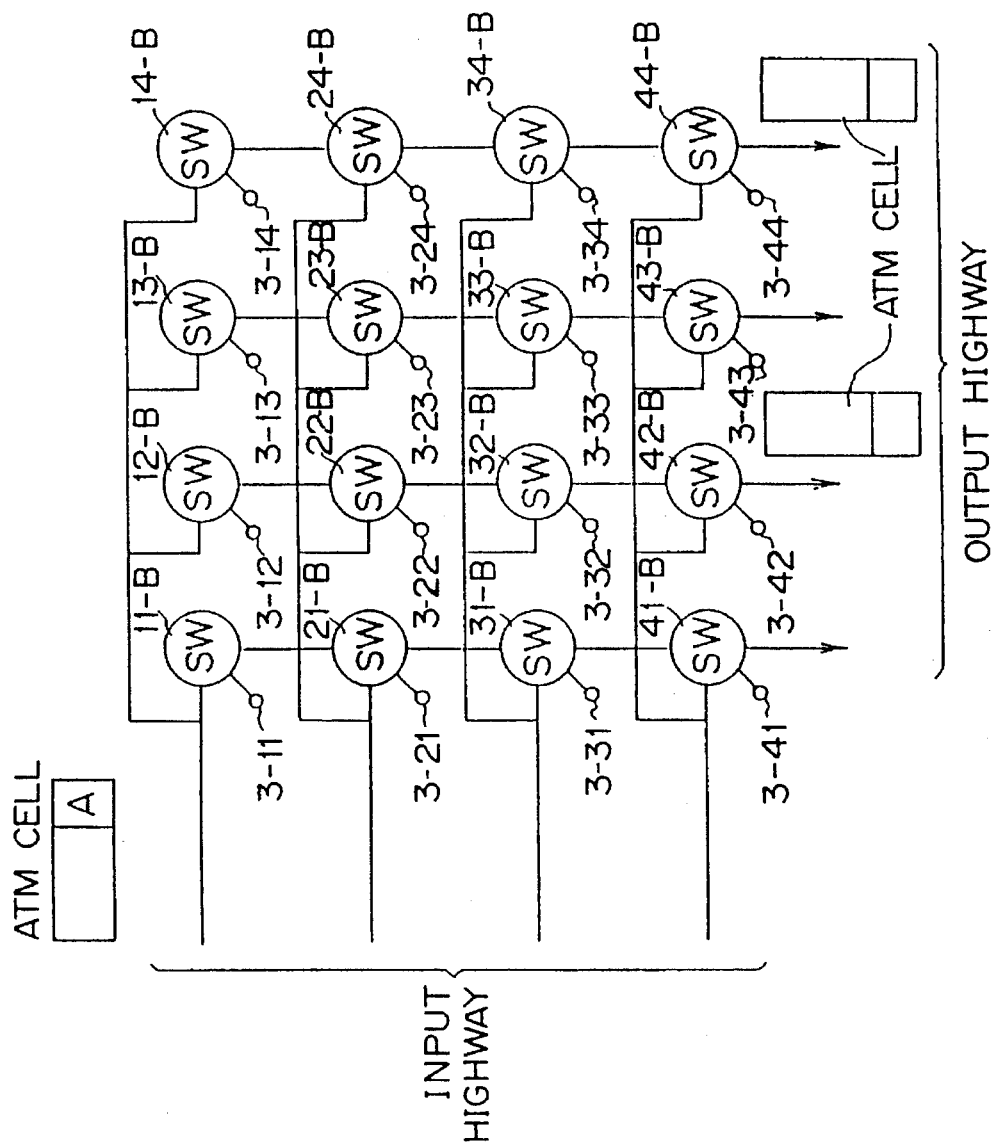
FIG. 6 is a block diagram showing the broadcasting system according to the second principle of this invention.

FIG. 6 is a block diagram showing the broadcasting system according to the second principle of this invention.

The configuration shown in FIG. 6 is different from that in FIG. 3, a block diagram showing the broadcasting system per the first principle of this invention, in that the system of FIG. 6 includes ATM-cell-switching VCI/VPi determinant memories 3-11 through 3-44 which store data for determining which ATM cells of VCIs are to be switched at the corresponding switch elements (SWs) 11-B through 44-B, whereas the system of FIG. 3 instead includes CNVs 10 through 40 for converting the VCI/VPi of ATM cells inputted from the same input highway.

FIG. 7 shows exemplary contents stored in an ATM-cell-switching VCI determinant memory for memorizing the VCI/VPi of the ATM cells to be switched.

In FIG. 7, ATM-cell-switching VCI/VPi determinant memories 3-11 through 3-44 store, for respective addresses having bit lengths equal to the bit length of VCIs, 1-bit data of either 1 or 0 indicating whether or not the inputted ATM cells are switched to be outputted to the output highways corresponding to SW 11-B through 44-B.

Figure 8:
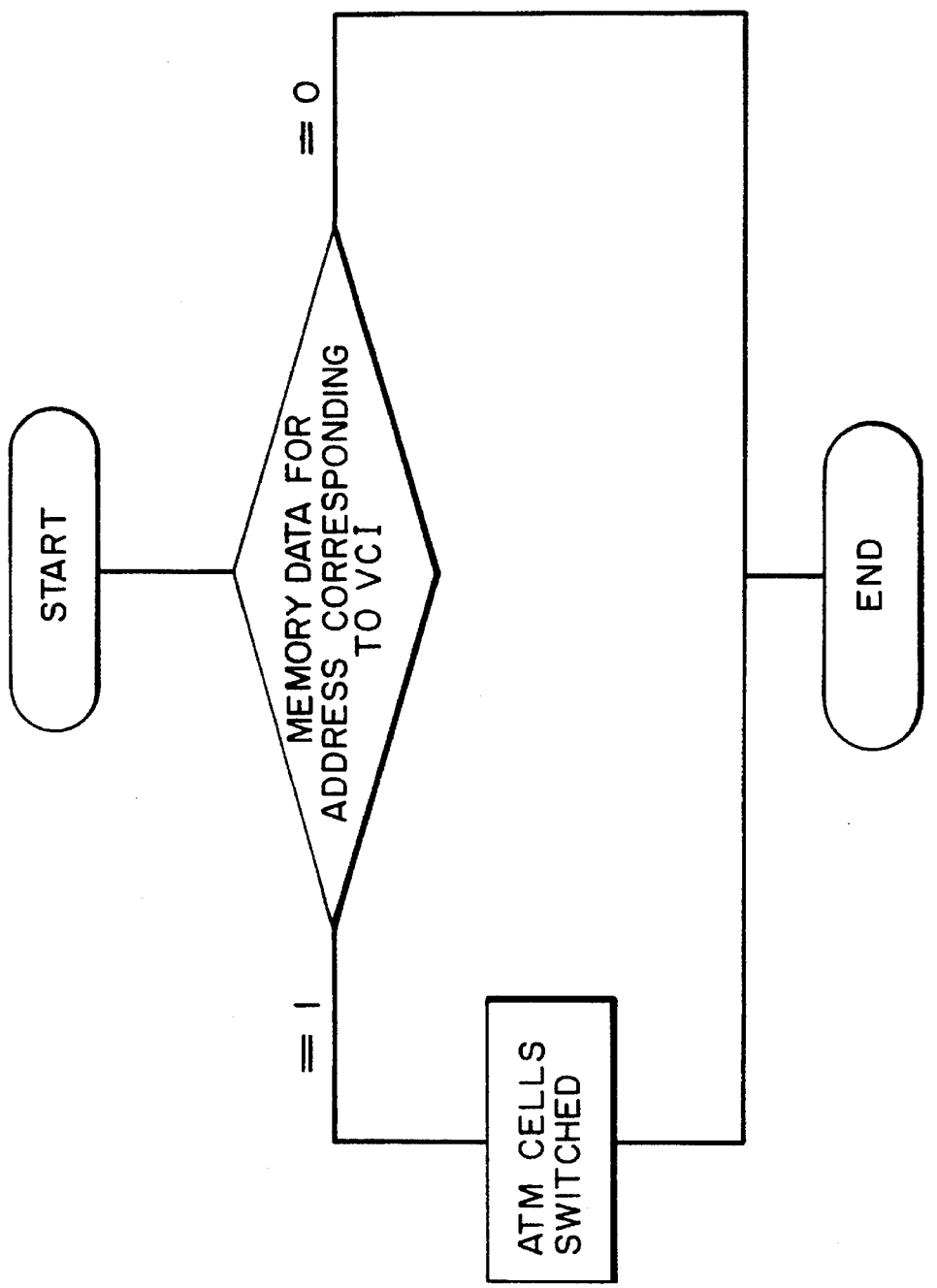
FIG. 8 is a flowchart of a switching judgment embodying the second principle of this invention.

FIG. 8 is a flowchart of a switching judgment embodying the second principle of this invention.

In FIG. 8, after the processes begin, data for the addresses corresponding to the VCIs of inputted ATM cells are read first from ATM-cell-switching VCI determinant memories 3-11 through 3-44, as shown in FIG. 7, and the processes end without or after switching inputted ATM cells when it is 0 or 1.

As described so far, this invention enables ATM cells inputted from an input highway to be outputted simultaneously to a plurality of output highways, thereby enabling ATM cells to be broadcast to a plurality of destinations, which enhances the effectiveness of any communication system utilizing ATM cells.

What is claimed is:

1. An asynchronous transfer mode cell broadcasting system comprising:
    a switch module including a plurality of switches for exchanging asynchronous transfer mode cells inputted from an input line connected to N switches of said plurality of switches; and
    a tag information adder, provided in the input line, for adding tag information including N bits, each bit being respectively allocated to a corresponding one of said N switches, said tag information indicating whether each of said N switches outputs a cell from the input line according to a respective identifier assigned to an asynchronous transfer mode cell so that said asynchronous transfer mode cells are outputted to a plurality of output lines connected to the switches designated by the tag information.

2. The asynchronous transfer mode cell broadcasting system as set forth in claim 1, wherein:
    said tag information is added to a head portion of said asynchronous transfer mode cells for sequentially storing, after said tag information, virtual path numbers, virtual channel numbers, maintenance information, and user data.

3. The asynchronous transfer mode cell broadcasting system as set forth in claim 1, wherein:

a bit length of said tag information corresponds to a number of switches connected to the input line provided with said tag information adder;

respective bits in said bit length indicate whether or not said switches in correspondence switch said asynchronous transfer mode cells inputted from said input line; and said switches indicated by said bits in correspondence output said asynchronous transfer mode cells to the output lines.

4. The asynchronous transfer mode cell broadcasting system as set forth in claim 1, wherein:

said identifiers assigned to said asynchronous transfer mode cells are the respective virtual path numbers and/or virtual channel numbers of said asynchronous transfer mode cells.

5. The asynchronous transfer mode cell broadcasting system as set forth in claim 4, wherein:

said tag information adder includes converters which add said tag information according to said virtual path numbers and/or virtual channel numbers.

6. An asynchronous transfer mode cell broadcasting system comprising:

a switch module including a plurality of switches for exchanging asynchronous transfer mode cells inputted from an input line; and asynchronous transfer mode-cell-switching identifier determinant memorizing means, each provided for a respective switch in said switch module, said memorizing means storing, according to respective identifiers assigned to said asynchronous transfer mode cells, determinant data information for indicating which ones of said asynchronous transfer mode cells are to be switched and which ones of said switches are to be turned ON so that the asynchronous transfer mode cells which are switched based on said determinant data information are outputted to a plurality of output lines connected to the switches which are turned ON according to said determinant data information so as to enable said asynchronous transfer cells to be broadcast to a plurality of destinations.

7. The asynchronous transfer mode cell broadcasting system as set forth in claim 6, wherein:

said identifiers assigned to said asynchronous transfer mode cells are the respective virtual path numbers and/or virtual channel numbers of said asynchronous transfer mode cells.

8. The asynchronous transfer mode cell broadcasting system as set forth in claim 7, wherein:

said asynchronous transfer mode-cell-switching identifier determinant memorizing means stores, at the addresses corresponding to said virtual path numbers and/or virtual channel numbers, said determinant data information.

9. The asynchronous transfer mode cell broadcasting system as set forth in claim 8, wherein:

respective switches in said switch module refer to said asynchronous transfer mode-cell-switching identifier determinant memorizing means for storing said determinant data information at said addresses corresponding to said virtual asynchronous transfer mode cells inputted from said input line connected to said switches; and said switches output said asynchronous transfer mode cells to the output lines, when said switches determine, from said identifiers and said determinant data information, to switch said asynchronous transfer mode cells.

10. A switching information adding apparatus for a switching system accommodating a plurality of input lines and a plurality of output lines, said plurality of input lines being connected to said plurality of output lines through gates, said switching information adding apparatus comprising:

a receiver for receiving a fixed-length packet including destination information transmitted over at least one of said plurality of input lines;

a storage for storing switching information indicating whether or not a fixed-length packet is made to go through each of the gates connected to said at least one of said input lines corresponding to the destination information of the fixed-length packet;

an information adder for adding switching information obtained from said storage based on the destination information of the fixed-length packet to the fixed-length packet; and an output unit for outputting the fixed-length packet having the switching information to the switching system.

11. A switch for accommodating an input line and a plurality of output lines, said input line being connected to said plurality of output lines through respective gates, for outputting a fixed-length packet having switching information transmitted from said input line to said plurality of output lines on the basis of the switching information, said switch comprising:

an information analyzer, provided for each of the gates, for obtaining information which is allocated to a specific gate from the switching information included in the fixed-length packet and for determining whether or not corresponding information indicates that the fixed length packet is to go through the specific gate; and a controller, provided for each of the gates for having said fixed-length packet go through the specific gate when the information analyzer indicates that said fixed-length packet is to go through the specific gate.

12. A fixed-length packet broadcasting system comprising:

a switch module including a plurality of switches for exchanging fixed-length packets inputted from an input line connected to N switches of said plurality of switches; and a tag information adder, provided in the input line, for adding tag information including N bits, each bit being respectively allocated to a corresponding one of said N switches, said tag information indicating whether each of said N switches outputs a packet from the input line according to a respective identifier assigned to a fixed-length packet so that said fixed-length packets are outputted to a plurality of output lines connected to the switches of said switch module, designated by the tag information.

13. A fixed-length packet broadcasting system comprising:

a switch module including a plurality of switches for exchanging fixed-length packets inputted from an input line; and switching identifier determinant memorizing means, provided in said switch module, said memorizing means storing, according to respective identifiers assigned to said fixed-length packets, determinant data information for indicating which one of said fixed-length packets are to be switched and which ones of said switches are to be turned ON so that the fixed-length packets which are switched based on said determinant data information are outputted to a plurality of output lines connected to the switches of said switch module, which are turned ON according to said determinant data information so as to enable said fixed-length packets to be broadcast to a plurality of destinations.

* * * * *